United States Patent

Hartel

[11] Patent Number: 5,897,276
[45] Date of Patent: Apr. 27, 1999

[54] U-SHAPED CLIP-ON SLIDE NUT

[75] Inventor: Marc Hartel, Reiskirchen, Germany

[73] Assignee: Rittal-Werk Rudolf Loh Gmbh & Co. KG, Herborn, Germany

[21] Appl. No.: 08/894,898
[22] PCT Filed: Jun. 18, 1996
[86] PCT No.: PCT/EP96/02617
§ 371 Date: Aug. 29, 1997
§ 102(e) Date: Aug. 29, 1997
[87] PCT Pub. No.: WO97/02434
PCT Pub. Date: Jan. 23, 1997

[30] Foreign Application Priority Data

Jul. 6, 1995 [DE] Germany .......................... 195 24 648

[51] Int. Cl.[6] ............................. F16B 27/00; F16B 37/02
[52] U.S. Cl. ........................... 411/174; 411/85; 411/427; 411/966
[58] Field of Search ..................................... 411/104, 174, 411/175, 84, 85, 182, 427, 966

[56] References Cited

U.S. PATENT DOCUMENTS

| 4,725,100 | 2/1988 | Patti | 411/174 X |
| 5,375,798 | 12/1994 | Hungerford, Jr. | 411/104 X |
| 5,707,192 | 1/1998 | Vortriede et al. | 411/175 |

Primary Examiner—Neill Wilson
Attorney, Agent, or Firm—Speckman Pauley Peterson & Fejer

[57] ABSTRACT

A U-shaped clip-on slide nut with two parallel sliding limbs provided with notch elements and capable of being clipped onto an undercut ridge. One sliding limb has a bore and the other limb is provided with a threaded bore aligned with the bore and accommodating a clamping screw. The invention facilitates fixing of a component on the ridge in that the bore is a blind bore, the clamping screw is a countersunk screw, and at least one sliding limb also has a screw receptacle for a securing screw.

9 Claims, 2 Drawing Sheets

U-SHAPED CLIP-ON SLIDE NUT

BACKGROUND OF THE INVENTION

1. Field of the Invention

This invention relates to a U-shaped slip-on slide nut having two parallel sliding legs with detent elements which can be clipped on an undercut bar, wherein one sliding leg has a bore and the other sliding leg has a threaded bore, aligned with the bore, for a clamping screw.

2. Description of the Prior Art

Slip-on slide nuts of this type are known from German Patent References DE 25 43 021 B2 and DE 35 24 400 C3 and are employed for diverse uses. The fastening screw can in this case be used for axially positioning the slip-on slide nut on the bar. Furthermore, as known from German Patent Reference DE 35 24 400 C3, it is possible to fix an additional component, for example a front panel, in place on a component provided with a bar, such as a connecting bar. The front panel has a fastening bore aligned with the bore and the threaded bores in the sliding legs. This dual function of the fastening screw makes assembly considerably more difficult, since it is necessary, in addition to positioning the slip-on slide nut on the bar, to align simultaneously the front panel with respect to the slip-on slide nut. However, this is practically impossible to perform by a single person without assistance.

SUMMARY OF THE INVENTION

It is one object of this invention to provide a slip-on slide nut of the above-discussed type, wherein positioning on the bar and application of an additional component can be easily performed by a single person.

In accordance with this invention this object is attained with a bore that is embodied as a blind bore and the clamping screw as a flat head screw. At least one sliding leg has a screw receptacle for a fastening screw.

The slip-on slide nut can be clipped on the bar and can be positioned on the bar. Subsequently the additional component can be fastened to the slip-on slide nut with the additional fastening screw. The flat head screw does not hinder attachment of the additional component. In this case the screw receptacle can be formed in the sliding legs outside of the blind bore or the threaded bore for the clamping screw, but inside or outside of the area of the sliding leg receiving the bar.

In this case the screw receptacle is preferably embodied as a bore for a tapping fastening screw, or the screw receptacle is designed as a threaded bore for the fastening screw.

An improved fixing of the slip-on slide screw in place on the bar is attained with a further embodiment wherein the sliding leg not provided with the screw receptacle has a bore, which is aligned with the screw receptacle, for the fastening screw.

A slip-on slide nut which is easily and cost-effectively produced is distinguished in that the slip-on slide nut is formed from a stamped and bent element, wherein free ends of the sliding legs have end sections which are bent inward toward each other and are used as detent elements.

BRIEF DESCRIPTION OF THE DRAWINGS

This invention will be explained in detail by means of an exemplary embodiment represented in the drawings wherein.

DESCRIPTION OF PREFERRED EMBODIMENTS

Figure 1:
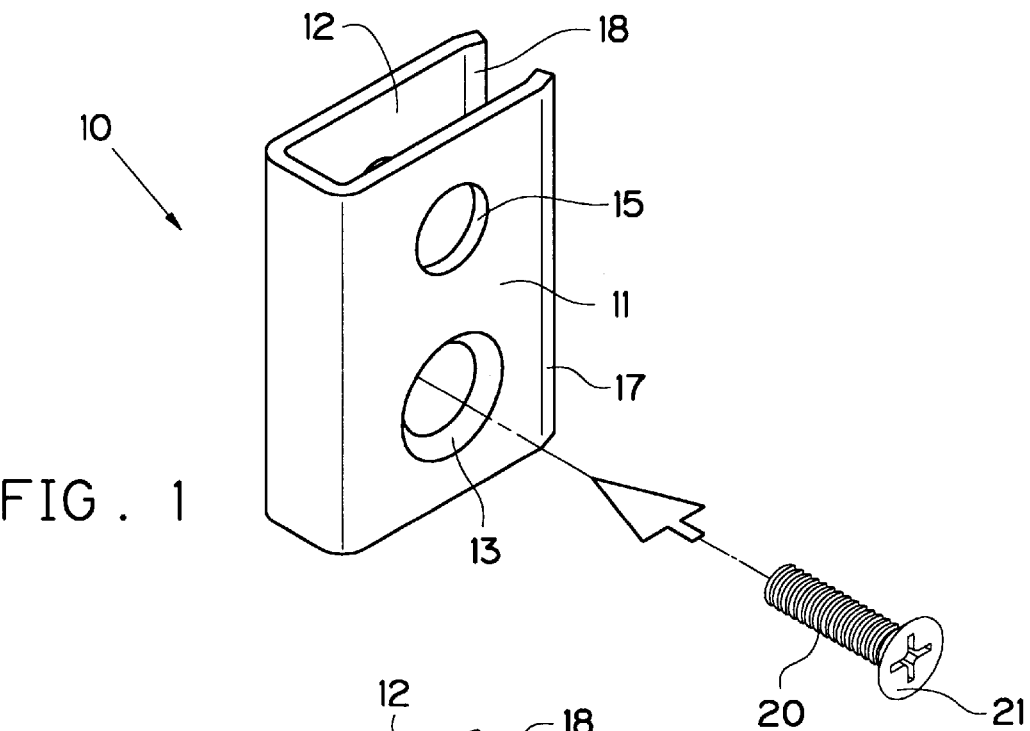
FIG. 1 is an exploded perspective view of a slip-on slide nut.
Figure 2:
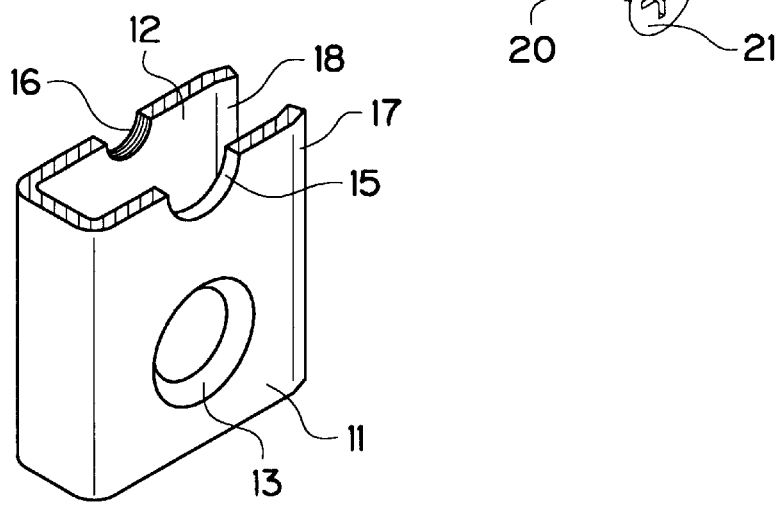
FIG. 2 is a perspective sectional view taken through an additional screw receptacle for the fastening screw.

The slip-on slide nut shown in a perspective view in FIG. 1 is produced with a uniform wall thickness and therefore can be manufactured in a simple and cost-effective manner as a stamped and bent element 10. The U-shaped slip-on slide nut has two parallel and spaced-apart sliding legs 11 and 12 which, on their free ends, have end sections 17 and 18, which are bent toward each other. These end sections 17 and 18 and the distance between the sliding legs 11 and 12 are matched to the undercut bar 19 of a profiled section 35 in such a way, that the slip-on slide nut can be clipped on the bar 19, as indicated by reference numeral 1 in FIG. 4.

Figure 3:
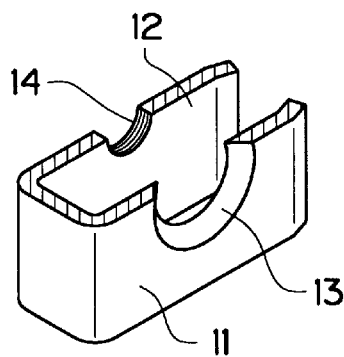
FIG. 3 is a perspective sectional view taken through the blind bore and the threaded bore for the clamping screw.

The sliding legs 11 and 12 receive a clamping screw. In this case the sliding leg 11 facing the assembly side has a blind bore 13 for the clamping screw, which is embodied as a flat head screw 20, while the other sliding leg 12 has an aligned threaded bore 14, as shown in the section in FIG. 3. The blind bore 13 in a flush manner receives the head 21 of the flat head screw 20. The blind bore 13 and the threaded bore 14 are cut in the areas of the sliding legs 11 and 12 which are positioned outside the bar 19 when the clipped-on slip-on slide nut has been positioned on the bar 19. The clipped-on slip-on slide nut can be positioned on the bar 19 by means of the flat head screw 20. The slip-on slide nut is pushed into the desired position on the bar 19 and clamped to the bar 19 by means of the clamping screw, such as shown by the reference numeral 2 in FIG. 4.

The flat head screw 20 is inserted into the blind bore 13 and is screwed past the bar 19 into the threaded bore 14. In the process the sliding legs 11 and 12 are pulled toward each other and clamped to the bar 19. The slip-on slide nut is thus fixed axially immovably on the bar 19.

Figure 4:
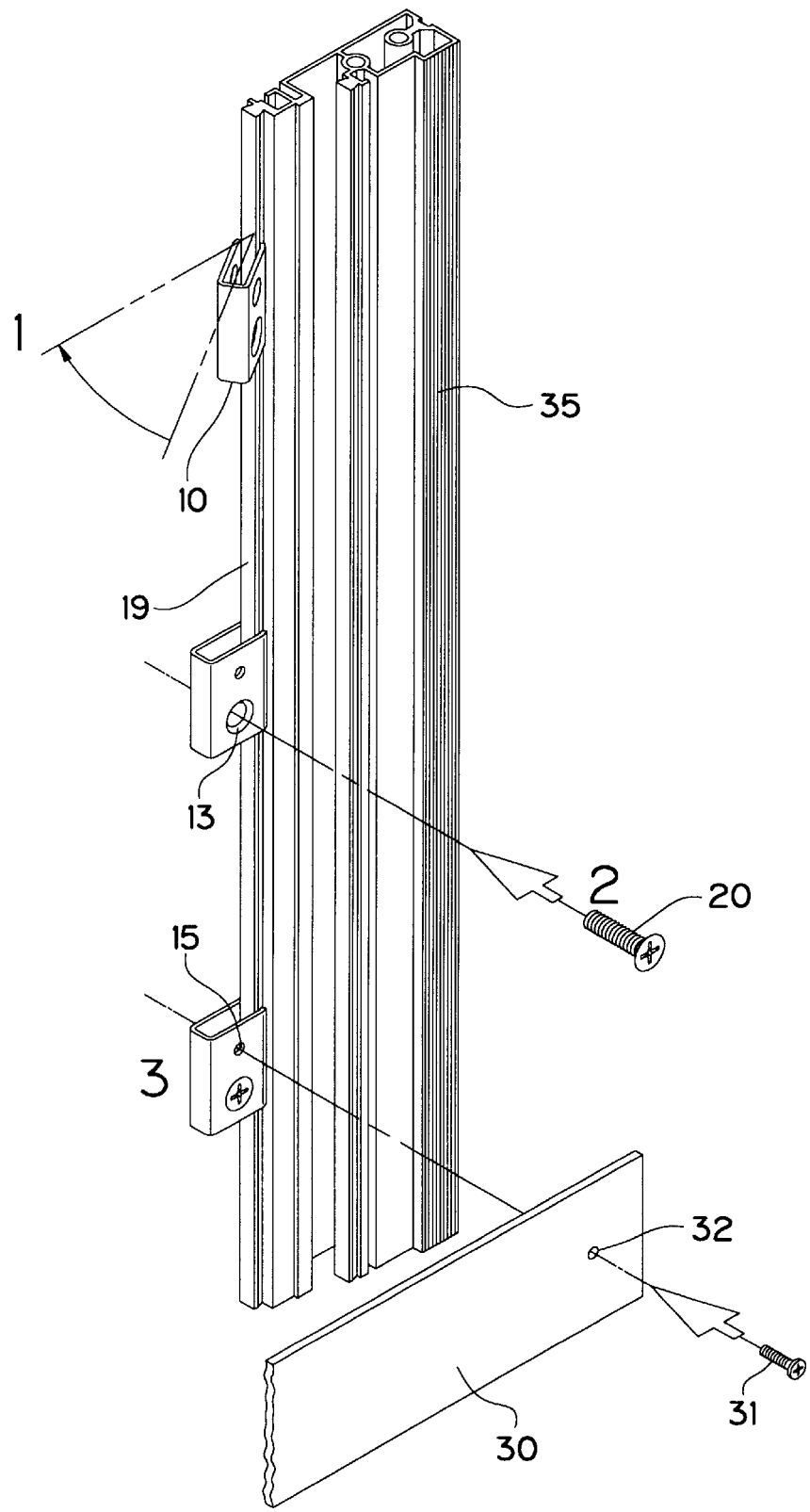
FIG. 4 is an exploded perspective view of an attachment of a panel-shaped component to a profiled section having an undercut bar with a slip-on slide nut.

A panel-shaped component 30, for example, is fixed on the assembly side of the slip-on slide nut by means of a fastening screw 31, as indicated by reference numeral 3 in FIG. 4. In the process the fastening screw 31 is guided through a bore 32 of the component 30 and the bore 15 in the sliding leg 11, and screwed into the threaded bore 16 of the sliding leg 12. In this case the fastening screw 34 is used as an additional clamping screw, since it is also passed along the bar 19. However, the fastening screw 31 can also be screwed directly into a screw receptacle in the sliding leg 11, wherein this screw receptacle can also be disposed in an area of the installed bar 19. This screw receptacle can be embodied as a threaded bore for a fastening screw 31 having a corresponding thread, or as a bore for a tapping fastening screw.

The positioning of the slip-on slide screw can take place prior to the attachment of the component 30, which considerably simplifies the assembly, as the assembly steps identified by the reference numerals 1 to 3 show.

It is also possible to provide both sliding legs 11 and 12 with a screw receptacle, so that both exterior faces of the sliding legs 11 and 12 can be used as fastening surfaces.

I claim:

1. In a U-shaped slip-on slide nut having two parallel sliding legs with detent elements to be clipped on an undercut bar, wherein one sliding leg of the sliding legs has a bore, and the other sliding leg of the sliding legs has a threaded bore aligned with the bore for a clamping screw, the improvement comprising:

the bore being a blind bore (13) and the clamping screw being a flat head screw (20), and the other sliding leg (12) having a screw receptacle (16) for a fastening screw (31).

2. In the U-shaped slip-on slide nut in accordance with claim 1, wherein the screw receptacle (16) is embodied as a bore for accommodating a tapping fastening screw (31).

3. In the U-shaped slip-on slide nut in accordance with claim 1, wherein the first screw receptacle (16) is embodied as a threaded bore for accommodating the fastening screw (31).

4. In the U-shaped slip-on slide nut in accordance with claim 3, wherein the screw receptacle (16) is cut outside of one of the blind bore (13) and the threaded bore (14) and is cut outside of an area of the sliding legs (11, 12) receiving the bar (19).

5. In the U-shaped slip-on slide nut in accordance with claim 4, wherein the one sliding leg (11) has a bore (15) aligned with the screw receptacle (16) for accommodating the first fastening screw (31).

6. In the U-shaped slip-on slide nut in accordance with claim 5, wherein free ends of the sliding legs (11, 12) each have an end section (17, 18) and the end sections (17, 18) are bent toward each other for use as detent elements.

7. In the U-shaped slip-on slide nut in accordance with claim 1, wherein the screw receptacle (16) is cut outside of one of the blind bore (13) and the threaded bore (14) and is cut outside of an area of the sliding legs (11, 12) receiving the bar (19).

8. In the U-shaped slip-on slide nut in accordance with claim 1, wherein the one sliding leg (11) has a bore (15) aligned with the screw receptacle (16) for accommodating the fastening screw (31).

9. In the U-shaped slip-on slide nut in accordance with claim 1, wherein free ends of the sliding legs (11, 12) each have an end section (17, 18) and the end sections (17, 18) are bent toward each other for use as detent elements.

* * * * *